US005787996A

United States Patent [19]

Fünfer

[11] Patent Number: 5,787,996

[45] Date of Patent: Aug. 4, 1998

[54] DRILLING AND/OR CHISELING TOOL

[75] Inventor: Josef Fünfer, Königsbrunn, Germany

[73] Assignee: Hilti Aktiengesellschaft, Fürstentum, Liechtenstein

[21] Appl. No.: 730,975

[22] Filed: Oct. 16, 1996

[30] Foreign Application Priority Data

Oct. 30, 1995 [DE] Germany .......................... 195 40 396.7

[51] Int. Cl.[6] ........................................................ B23B 45/16

[52] U.S. Cl. ............................ 173/104; 173/109; 173/205; 173/114

[58] Field of Search ..................................... 173/104, 109, 173/114, 48, 122, 205; 74/60

[56] References Cited

U.S. PATENT DOCUMENTS

| | | | |
|---|---|---|---|
| 4,280,359 | 7/1981 | Schmid et al. | 173/109 |
| 4,284,148 | 8/1981 | Wanner et al. | 173/109 |
| 4,719,976 | 1/1988 | Bleicher et al. | 173/109 |
| 4,732,218 | 3/1988 | Bleicher et al. | 173/104 |
| 5,373,905 | 12/1994 | Bleicher et al. | 173/109 |

*Primary Examiner*—Joseph J. Hail, III
*Assistant Examiner*—Jay A. Stelacone
*Attorney, Agent, or Firm*—Anderson Kill & Olick, P.C.

[57] ABSTRACT

A drilling and/or chiseling tool includes a striking mechanism (28) driven by a swash pin (12) of a swash mechanism (25). The actuation of the swash pin (12) is effected by a single piece intermediate shaft (11) powered by a drive motor (4). The shaft (11) causes a swash ring (13) from which the swash pin (12) projects, to move due to a rolling track (15) arranged at an angle to the drilling direction of the tool. The drilling direction extends generally parallel to the axis of the intermediate shaft (11). This arrangement greatly assists in the ease of assembly and the economical fabrication of the tool.

6 Claims, 2 Drawing Sheets

DRILLING AND/OR CHISELING TOOL

BACKGROUND OF THE INVENTION

The present invention is directed to a drilling and/or chiseling tool with a striking mechanism driven by a swash lug of a swash mechanism.

A drilling and chiseling tool is disclosed in DE-OS 31 20 326 in which a striker mechanism has a spindle powered by an electric drive motor. A swash mechanism is located between the drive motor and the striking mechanism and the swash mechanism is formed of a shaft with two bearings supports, a hub body arranged nonrotatably on the shaft, a swash ring incorporating a swash pin disposed on the hub body so as to be freely rotatable thereon, and a drive pinion cooperating with the drive motor and connected to the mechanism shaft so that it rotates with the shaft. Internal splined shaft teeth, disposed in the hub body and the drive pinion, engage in external splined shaft teeth on the shaft and serve for the nonrotatable connection of the hub body and the drive pinion relative to the shaft. The external splined shaft teeth on the shaft, which engage a gear wheel acting as an output pinion and connected nonrotatably to the bit spindle, serve for the rotary drive in the spindle.

The splined shaft teeth are fabricated on machines having high hourly cost rates and have a negative effect upon the fabrication costs of the swash mechanism shaft, the bearing member and the drive pinion. Due to these high fabrication costs, this known drilling and/or chiseling tool cannot be produced economically.

SUMMARY OF THE INVENTION

Therefore, the primary object of the present invention is to provide a drilling and/or chiseling tool with a simple arrangement of a striking mechanism and a tool bit spindle drive which is easy to assemble and can be manufactured economically.

In accordance with the present invention, a single piece intermediate shaft for actuating a swash pin is provided and the shaft has a rolling track for a swash ring which incorporates the swash pin. At least one drive pinion is provided on the intermediate shaft and there is a bearing support on each side of the rolling track.

The intermediate shaft of the present invention in which the rolling track is formed and the drive pinion are arranged to form a single piece which is simple in its construction and can be fabricated economically and installed quickly and securely into the drilling and/or chiseling tool. The two bearing supports are spaced from one another and cooperate with corresponding bearing supports disposed in the housing of the drilling and/or chiseling tool. The intermediate shaft has the rolling track located between the bearing supports at an outside surface forming a basically ball-shaped member. The rolling track is inclined to the axis of the intermediate shaft and serves for receiving balls projecting into an additional rolling track in the inner surface of the swash ring. The swash pin projects radially outwardly from the swash ring.

Preferably, a first one of the bearing supports is located at a free end of the intermediate shaft. This easily accessible bearing has a trunnion which can be inserted into a friction bearing which is pressed into a corresponding bearing region in the tool housing. The diameter of the bearing trunnion corresponds to the internal diameter of the friction bearing. This first bearing trunnion can be formed by an end of the intermediate shaft located at its trailing end within the tool housing.

Preferably, the drive pinion is located between the bearing trunnion and the rolling track in the drilling and/or chiseling tools where the drive motor is arranged in a region of the housing located towards the trailing end of the housing with the drive shaft of the motor projecting from the motor housing in the forward direction. Accordingly, the drive pinion is located in the region of the trailing end of the intermediate shaft.

The driving motion transmitted by the swash pin from the intermediate shaft to the striking mechanism generates loads acting on the intermediate shaft perpendicularly to its axis. A good bearing arrangement or support for the intermediate shaft is obtained, if a second bearing is located between a leading free end of the intermediate shaft and the rolling track.

Preferably, a power take-off pinion is located at the leading end of the intermediate shaft, whereby in addition to the striking mechanism, a tool bit spindle cooperating with a drilling bit can be driven.

With the drive pinion of the intermediate shaft preferably provided with the larger effective diameter than the power take-off pinion, the tool bit spindle can be driven, so that the rpm of the bit spindle is lower than the rpm of the drive motor.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DETAILED DESCRIPTION OF THE INVENTION

Figure 1:
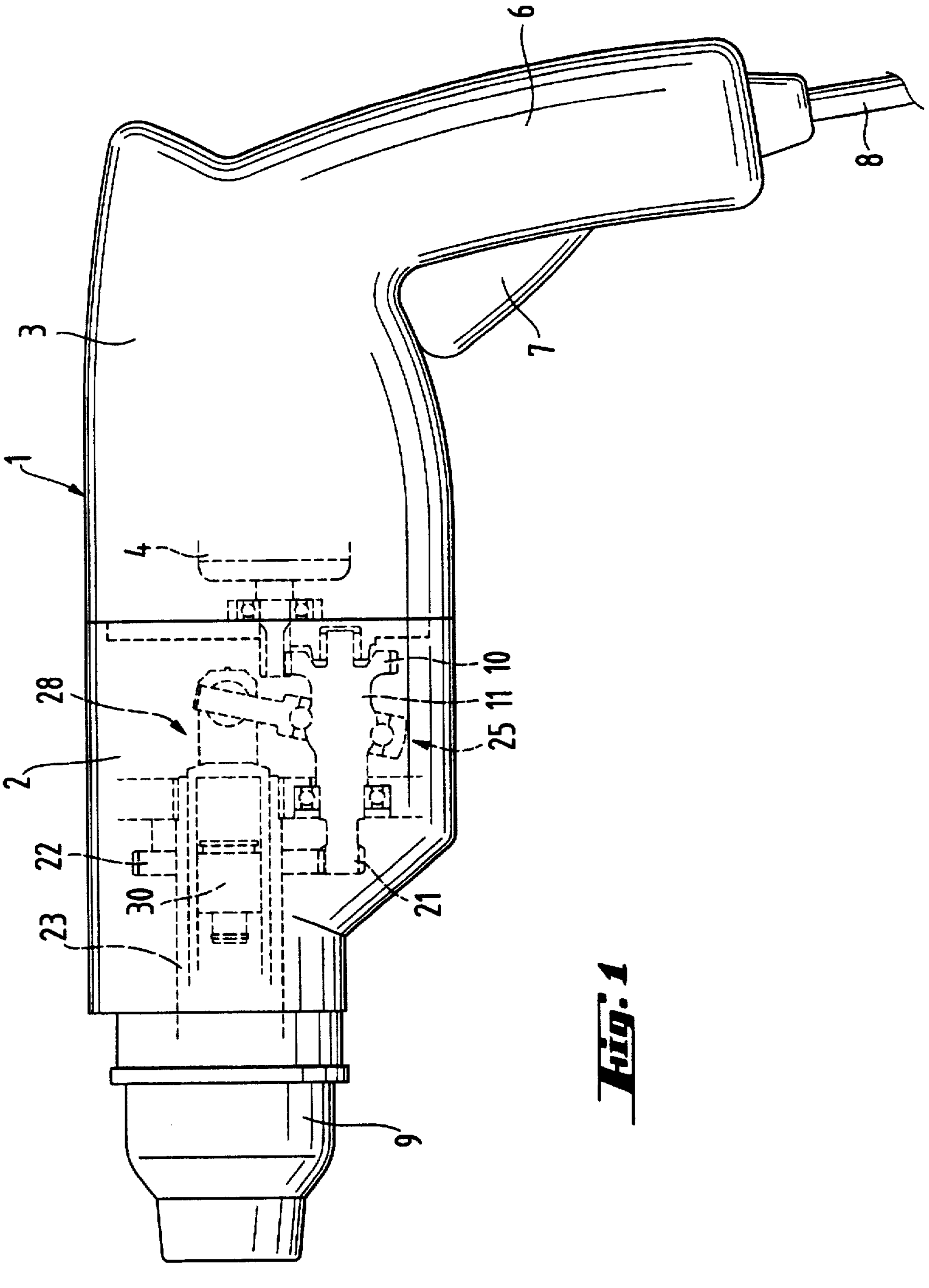
FIG. 1 is a side elevation view of a drilling and/or chiseling tool embodying the present invention with a swash mechanism shown in that within the tool housing.
Figure 2:
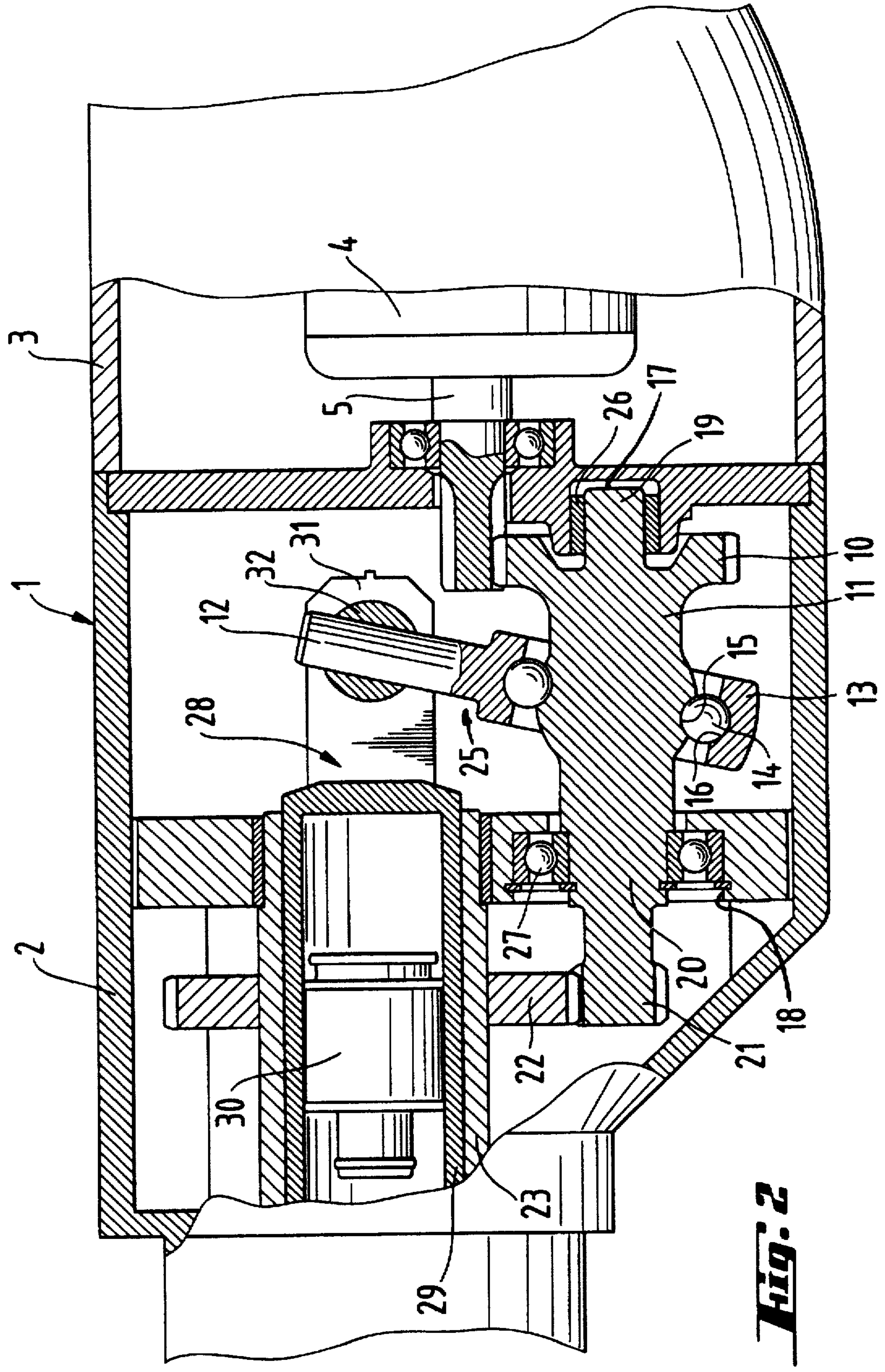
FIG. 2 is an enlarged partial sectional view of a part of the drilling and chiseling tool shown in FIG. 1.

In FIGS. 1 and 2 a drilling and/or chiseling tool is illustrated and includes a housing 1 with a handle 6 at its trailing end region. The drilling direction of the tool is from the right end to the left end as viewed in FIG. 1. The various parts within the housing are referred as having a leading end and a trailing end relative to the driving direction. An actuation switch 7 is located in the handle 6 and an electric cable 8 extends from the handle to a source of power. A tool bit chuck 9 is located at the leading end of the tool and is connected to an axially extending tool bit spindle 23. A drilling or chiseling bit, not shown, can be inserted into the tool bit chuck 9. The housing 1 is formed of a first housing component 2 extending from the tool bit chuck toward the trailing end of the tool and a motor housing component 3 extending from the first housing component to the trailing end of the housing. An electric drive motor 4 is located in the motor housing component 3 and can be started by the actuation switch 7.

The swash mechanism 25, shown particularly in FIG. 2, is formed of an axially extending intermediate shaft 11 having a first bearing trunnion 19 at its trailing end and a second bearing trunnion 20 toward its leading end. A drive pinion 10 is located adjacent to the trailing end of the intermediate shaft 11. A rolling track 15 encircles the outer surface of the intermediate shaft 11 at a location between its opposite ends. The rolling track is disposed at an angle to the axis of the intermediate shaft 11. A swash ring 13 encircles the rolling track and another rolling track 16 is located in an inner surface of the swash ring corresponding to the rolling track 15 on the intermediate shaft. A number balls 14 are located between and roll in the rolling tracks 15, 16. A swash pin 12 is formed as a part of the swash ring 13 and extends radially outwardly from the ring.

The swash ring is rotatably supported in the circumferentially direction relative to the intermediate shaft 11 by means of the balls. The balls 14 extend partially into the rolling track 15 on the outside surface of the intermediate shaft 11 and the rolling track is at an angle to the axis of the shaft. The balls 14 also extend partially into the rolling track 16 in the inner surface of the swash ring 13. The drive pinion 10 interengages with a set of teeth on the drive shaft 5 of the drive motor 4. The first bearing trunnion 19 forming a part of the intermediate shaft 11 is supported in a friction bearing 26 at a trailing end region 17 of the intermediate shaft adjacent the leading end of the motor housing component 3.

A power take-off or drive pinion 21 is located at the leading free end of and forms a part of the intermediate shaft and engages a gear wheel 22 connected to a tool bit spindle 23 so as to rotate with the spindle. The second bearing trunnion 20 is located between the rolling track 15 and the power take-off pinion 21 of the intermediate shaft 11 and is positioned in a ball bearing 27 rotated in a second bearing support 18 of the housing.

The striking mechanism 28 is formed of an axially extending cylinder 29 containing a striking piston 30 axially displaceable in the cylinder. The cylinder 29 is closed at its trailing end. A mobile joint 31 with a rotary bolt 32 in a trailing end region of the striking mechanism. The joint 31 has a bore extending transversely to the axial direction of the bolt 32. The swash pin 12 of the swash ring 13 engages in the bore so that it is axially displaceable. The cylinder 29 is coupled to the swash pin 12 so that it is unable to turn by means of the mobile joint 31 and the rotary bolt 32.

While specific embodiments of the invention have been shown and described in detail to illustrate the inventive principles, it will be understood that the invention may be embodied otherwise without departing from such principles.

What is claimed is:

1. A drilling and/or chiseling tool comprising an axially extending striking mechanism (28), a swash mechanism including a swash pin (12) engaging and driving said striking mechanism, an axially extending single piece intermediate shaft (11) for actuating said swash pin, said intermediate shaft (11) having a first end and a second end, said intermediate shaft (11) comprising a rolling track (15) extending circumferentially around an outside surface of said intermediate shaft between the first and second ends thereof, said swash mechanism includes a swash ring (13) encircling said rolling track (15), said swash ring (13) having a rolling track (16) in an inner surface facing said rolling track (15) in said intermediate shaft, balls (14) extending partially into said rolling track (15) of said intermediate shaft and into said rolling track (16) of said swash ring (13), said swash pin (12) is secured to and extends radially outward from said swash ring (13), at least one drive pinion (10) formed on said intermediate shaft (11), a first and a second bearing support (19, 20) for said intermediate shaft, said first bearing support (19) being located on a first end side of said rolling track and said second bearing support (20) being located on a second end side of the said rolling track (15).

2. A drilling and/or chiseling tool, set forth in claim 1, wherein said first bearing support (19) is located at the first end of the said intermediate shaft (11).

3. A drilling and/or chiseling tool, set forth in claim 2, wherein said at least one drive pinion (10) is located between the first bearing support (19) and said rolling track (15).

4. A drilling and/or chiseling tool, as set forth in one of the claims 1–3, wherein said second bearing support (20) is located between the second end of said intermediate shaft and said rolling track (15).

5. A drilling and/or chiseling tool, as set forth in claim 4, wherein a power take-off or drive pinion (21) is located at the second end of said intermediate shaft (11).

6. A drilling and/or chiseling tool, as set forth in claim 5, wherein said at least one drive pinion (10) has a larger effective diameter than said power-take off or drive pinion (21).

* * * * *